April 19, 1927.

C. P. EISENHAUER

1,625,197

WATER SOFTENING APPARATUS

Filed July 20, 1925

INVENTOR
CHARLES P. EISENHAUER
BY
ATTORNEYS

April 19, 1927.

C. P. EISENHAUER 1,625,197

WATER SOFTENING APPARATUS

Filed July 20, 1925

INVENTOR
CHARLES P. EISENHAUER

BY

ATTORNEYS

Patented Apr. 19, 1927.

1,625,197

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

WATER-SOFTENING APPARATUS.

Application filed July 20, 1925. Serial No. 44,716.

My invention relates to a water softening apparatus and particularly an automatic water softening apparatus.

It is the object of my invention to provide a water softening apparatus which is timed by the passage of the hard water through mechanism such as a meter and which is operated electrically.

In detail it is my object to provide contacts moved to operate or throw out of operation an electrical circuit, such contacts being moved by the meter or other mechanism actuated by the incoming hard water.

It is a further object to provide means for delivering water to the household system during the period of regeneration, and means for replenishing the brine tank.

It is a further object to provide means for increasing unrestricted flow during softening from the softener tank to the household system of pipes around the injector so that a large volume of softened water may be handled through the system and its capacity increased.

It is another object to provide visual means of indicating when the salt tank needs replenishing with salt.

It is a further object in such a system to provide for the delivery of water to the brine tank, to replenish it at the bottom of the tank and to withdraw the brine from the bottom of the tank thereof, insuring the circulation of the water through the salt and brine.

Referring to the drawings, the illustrations are arranged as follows:—

Figure 1:
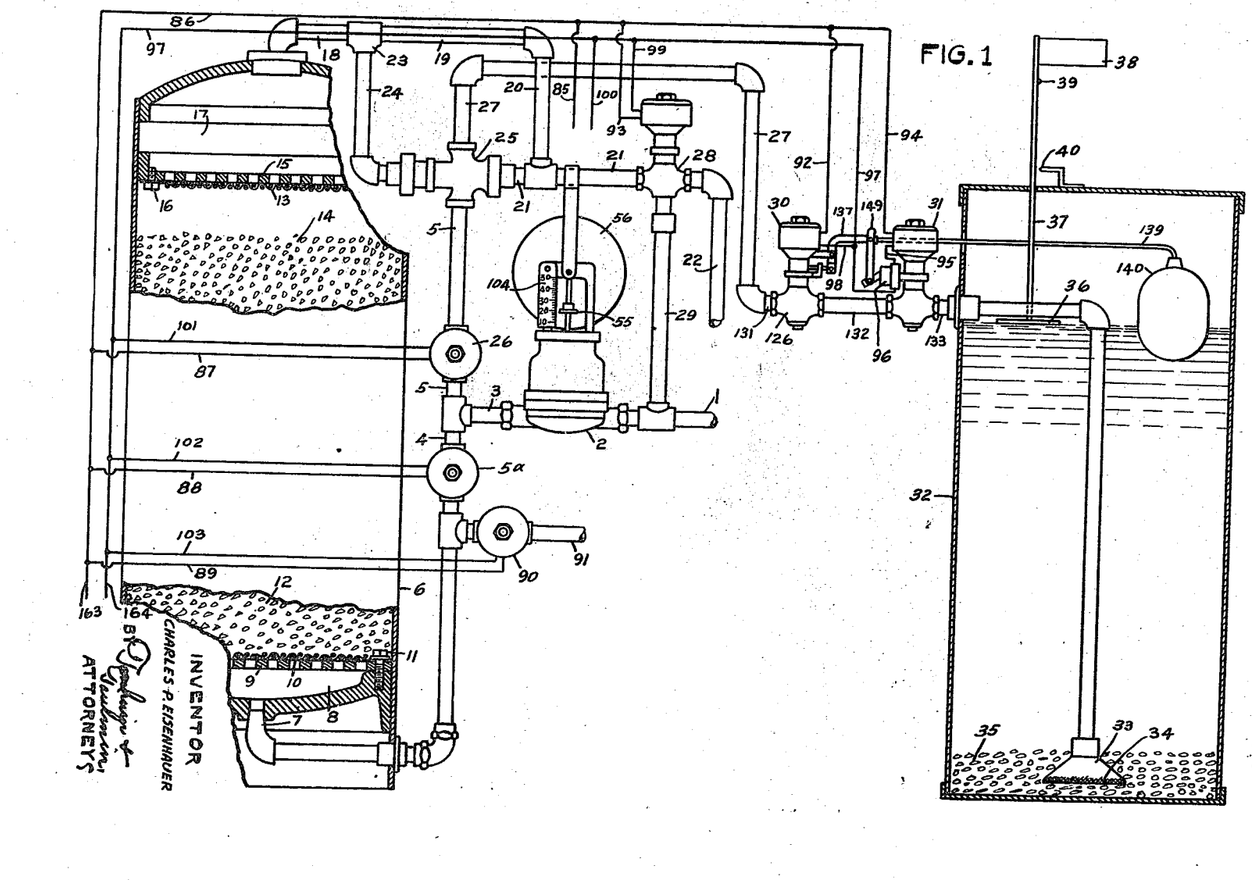
Figure 1 is a side elevation with the softening tank partially in section, and with the brine tank in section.

Referring to the drawings, 1 is an incoming hard water line which delivers hard water to the meter 2. The water passes out of the meter through the pipe 3. The pipe 3 is connected to a two-way line consisting of a pipe 4 and a pipe 5. The pipe 4 contains the softening supply valve $5^a$. This pipe 4 leads to the bottom of the softening tank 6 at 7. The hard water enters the bottom of the tank in the space 8 up to the grating 9 on which is mounted a metal screen 10. The grating and screen are held in position by the bolts 11. On this screen is a supply of softening mineral 12 of any desired character. This mineral extends within about 2 inches of the upper screen 13 as at 14. This screen is beneath the grating 15. Both the screen and grating are held in position on the softener casing by the bolts 16. A space 17 is provided above the upper screen and grating. At the top of this space is found the exit pipe 18. This exit pipe is connected to a pipe 19 and 20 which joins the main exit line 21 which is connected to the service line 22. Between the pipes 18 and 19 is a T 23 which is connected to a pipe 24, which, in turn, is connected to an injector casing 25. One side of this casing is connected to the pipe 5 in which is located a valve 26. Another side of this injector casing is connected to the salt line 27. The other side of the injector casing is connected to the pipe 21. Between the pipe 21 and the pipe 22 is a by-pass valve 28. Connected to this by-pass valve is a by-pass line 29 leading from the incoming line 1 to the valve. In the brine line 27 is a refill valve 30 and a brine valve 31. The brine line passes to the bottom of the brine tank 32 and terminates in a bell 33 with a screen 34 on the bottom thereof. This bell is located beneath a layer of diffusing gravel 35. In the brine tank is located a float 36 carrying a rod 37 and a flag 38. This flag and float mechanism is utilized to indicate when the tank needs replenishing with salt. The float is marked with a suitable marking point 39 which, when it comes opposite to the pointer 40, indicates that more salt should be put in the tank.

With this designation of the principal elements of my system, I will return to the details in order that the detail operation may be fully understood.

Figure 9:
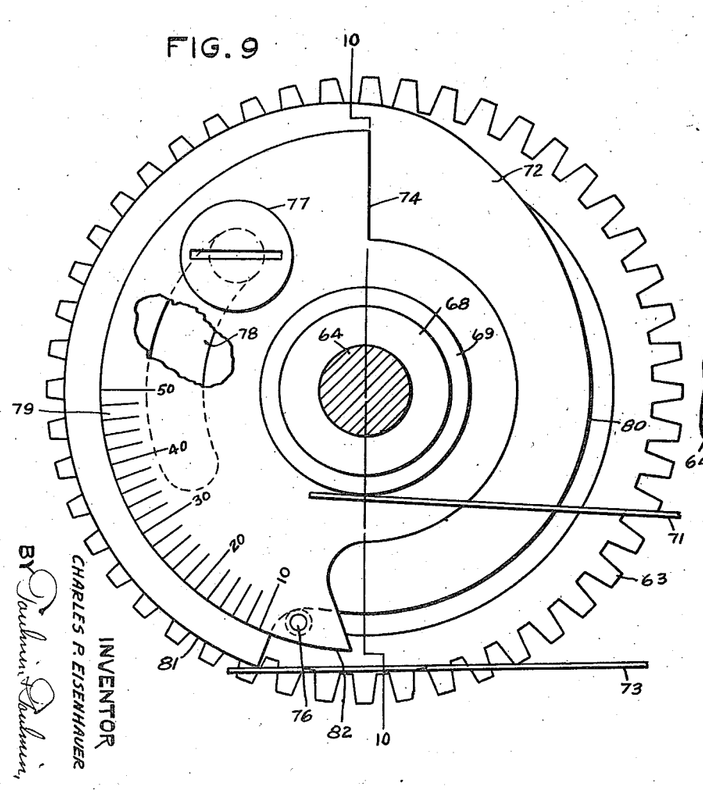
Figure 9 is a detail elevation of the contact mechanism partially broken away to show the adjusting slot.
Figure 10:
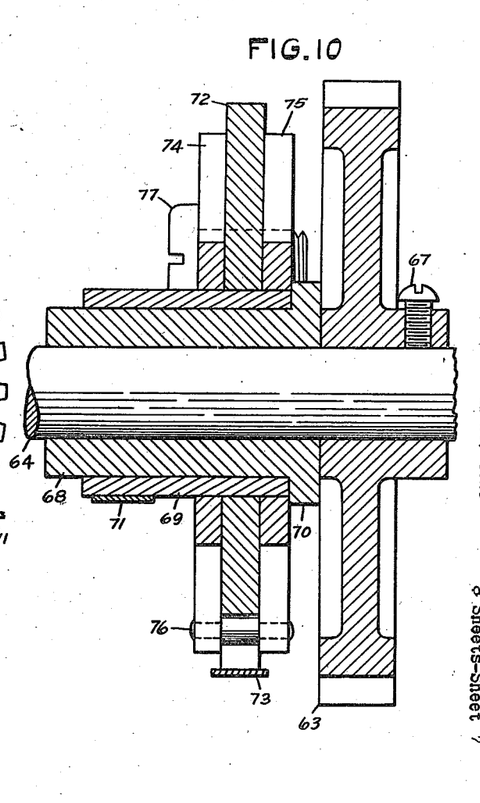
Figure 10 is a section on the line 10—10 of Figure 9.

The incoming hard water passes into the meter 2 through the passage way 41 into the chamber 42 where it actuates the plate 43 carrying the pin 44. When I refer to meter, I do not desire to confine myself to any particular form of water actuating mechanism but comprehend the use of various types of devices. The pin 44 working in the arm 45 which is carried on the shaft 46 serves to rotate that shaft. The water passes out of the opening 47 through the passageway 48 to the softener. This shaft 46 is connected by a set screw 49 to the shaft 50 which rests on the ball bearings 51 carried in the bracket 52. This shaft 50 has a series of transverse openings 53 for receiving a cotter pin 54 which supports on the shaft 50 a driving member 55 which engages with a disc 56 carried on the shaft 57. This disc is adjustably mounted on the shaft 57 by the set screw 58. The shaft is carried at one end in the bracket 59 and at the other end in a similar bracket 60. The shaft is thrust to one side so that the disc 56 will engage with the driving member 55 yieldingly by the spring 61 which is located in the bracket 60 with one end engaging the bracket and the other end engaging the shaft. This shaft 57 carries a worm 62 which drives a worm wheel 63. The worm wheel 63 is mounted on a worm wheel shaft 64 which, in turn, is supported in the brackets 65 and 66 mounted on the meter casing. This worm wheel is fixed to the shaft 64 by the set screw 67. Carried on this shaft 64 is an insulating fiber bushing 68. This bushing carries a brass contact sleeve 69 one end of which abuts against the shoulder 70 of the fiber bushing 68. A contact arm 71 rides on this brass bushing continuously as this contact is never broken. Mounted on this brass bushing is a bakelite plate 72 on either side of which there are mounted cam-shaped contact members for making and breaking contact with the finger 73, such members being designated 74 and 75. These members are joined together by the pin 76 and the set screw 77. The set screw 77 works in a slot 78 in the bakelite plate. A scale 79 is carried on one of these contact plates 74 or 75, preferably the former, so that the exact length of the period of regeneration may be determined by the amount of contact plate 74 and 75 which is exposed for engagement with the finger 73. It will be observed, as in Figure 9, that the finger 73 is kept away from contact of 74 and 75 because the bakelite plate is cam-shaped having a low portion of the cam at 80 and the high portion at 81. The amount of the high portion of the members 74 and 75 as at 82 determines the length of contact between the finger 73 and the exposed portions of the contact members 74 and 75. These contact fingers 71 and 73 are mounted upon a bracket 83 on either side of an insulating plate 84 carried thereby. The contact finger 71 is connected to a wire 85. This wire 85 is connected to the line 86 which is, in turn, connected by the wire 87 to the valve 26, by the wire 88 to the hard water softening valve 5ª and by the wire 89 to the drain valve 90 which is mounted in the drain line 91. It is also connected by the wire 86 through the wire 92 to the refill valve 30, by the wire 93 to the by-pass valve 28, and by the wire 94 to the brine valve 31. The other side of the brine valve is connected by the wire 95 to the switch 96 which is, in turn, connected by the wire 97 to the refill valve 30, through the wire 98. The wire 97 is connected by the wire 99 to the other side of the by-pass valve 28, by the wire 100 to the contact finger 73, by the wire 101 to the other side of the valve 26, by the wire 102 to the hard water softening valve 5ª and by the wire 103 to the other side of the drain valve 90.

Figures 4, 5:
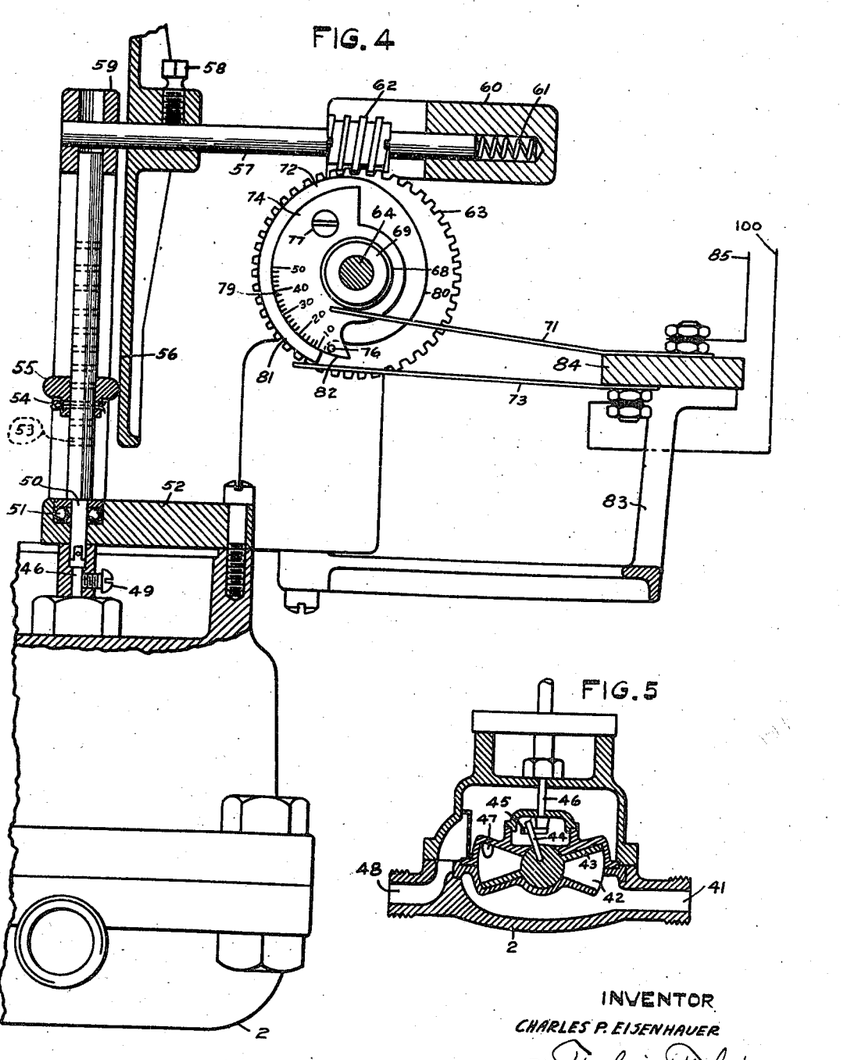
Figure 4 is a view of the meter and contact mechanism with the meter and driving mechanism partially in section.
Figure 5 is a section through the meter.
Figure 7:
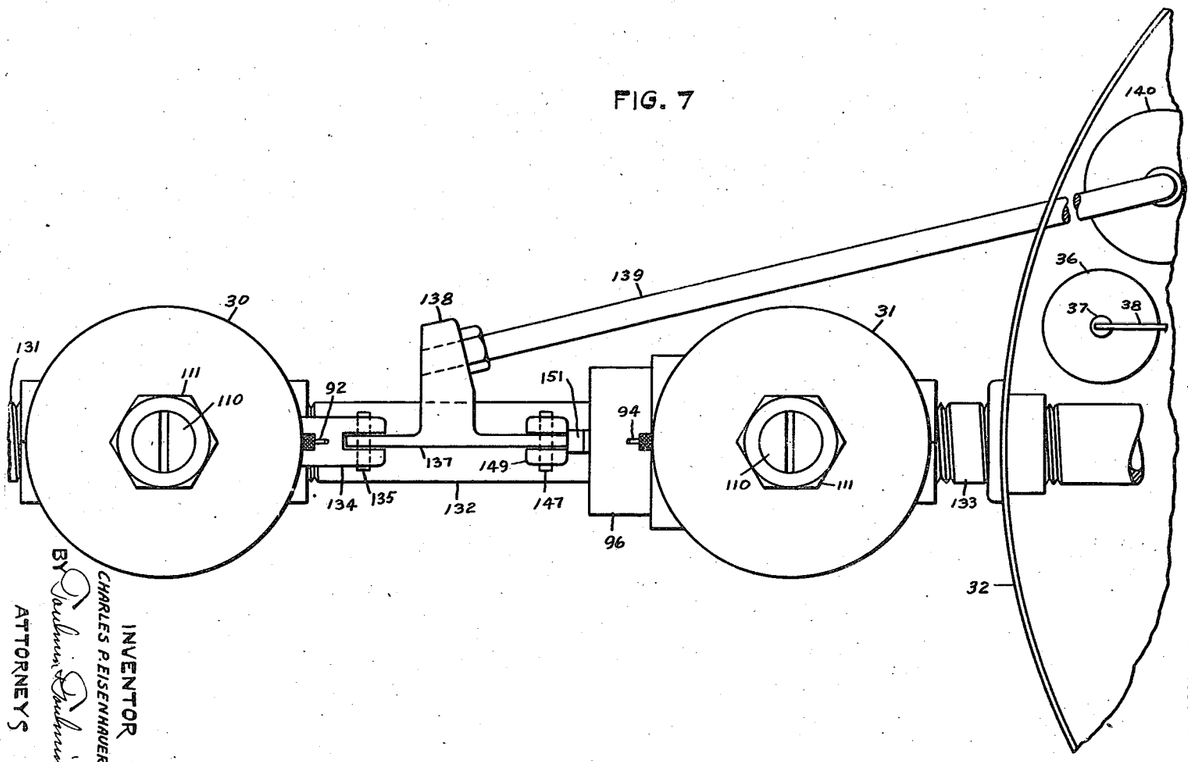
Figure 7 is a plan view of the refill and brine valves and a portion of the brine tank.

A scale 104 is provided adjacent the driving member 55 so that it may be positioned according to the grain gallon hardness desired.

Figure 8:
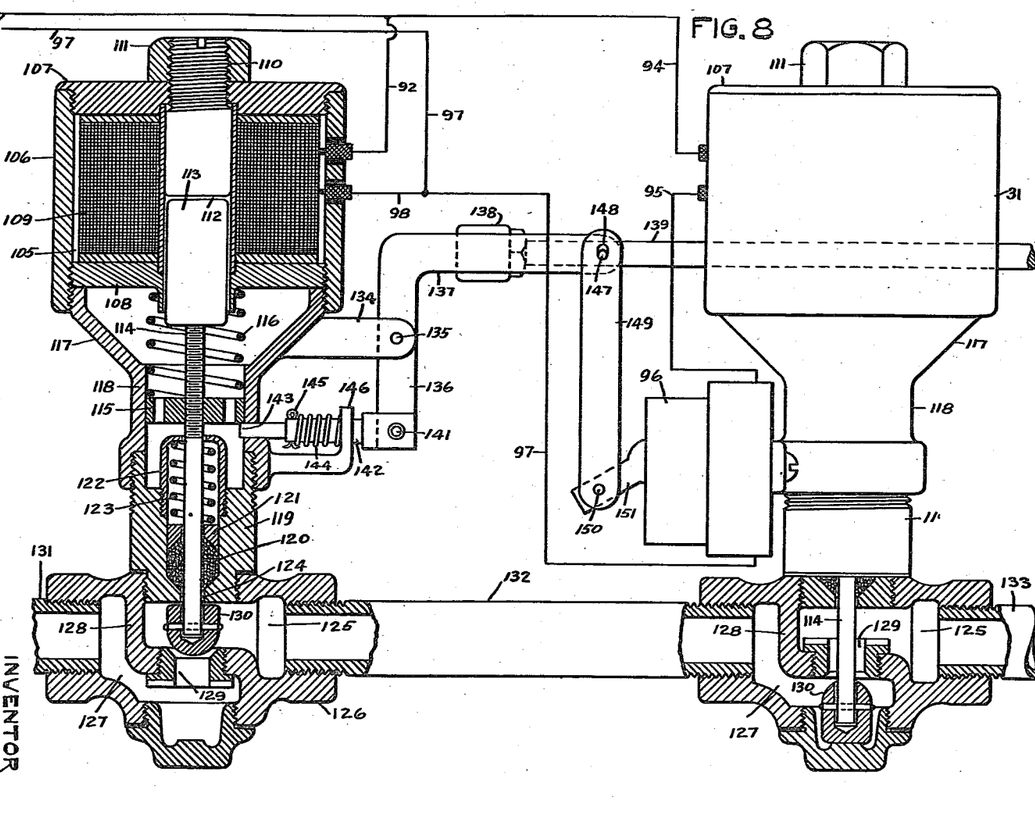
Figure 8 is a side elevation partially in section, of the refill valve and the brine valve.
Figure 11:
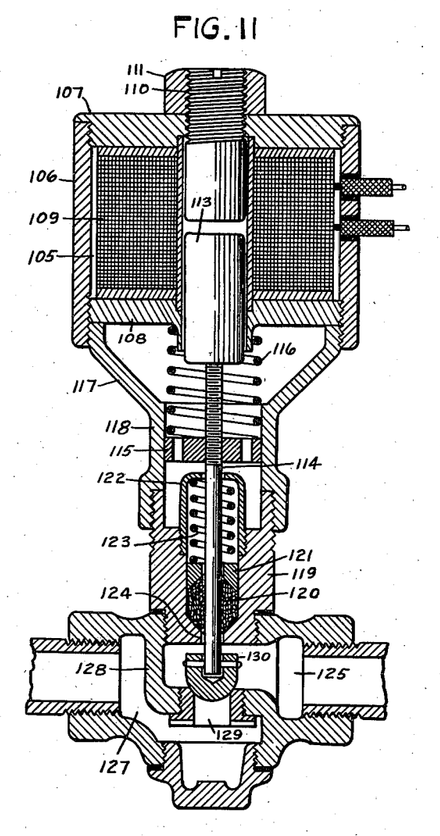
Figure 11 is a section of a typical valve.

In order that the operation of the valves may be understood, when these circuits are energized, reference may be had to Figure 8 and Figure 11. Referring in particular to Figure 8 which is a typical mechanism, save for the lock, it will be observed that the valve is composed of the following elements together with the actuating mechanism. In the chamber 105 formed by the cylindrical member 106 which has a screw cap 107 and a screw bottom 108 is a coil of wire 109. A threaded member 110 which is carried in the cover 107 and positioned by a nut 111 normally has a clearance of about $\frac{1}{32}$ of an inch as at 112 between its end and the end of the armature 113. This armature works within the coil of wire 109. The coil is connected to the wires 92 and 98. The armature 113 is carried on a threaded end 114 of a valve stem which also carries a piston 115 spaced from the armature. Between this piston 115 and the bottom of the plate 108 surrounding the armature 113 is a helical spring 116 which tends to keep the armature and the piston in its lowermost position. These parts are located within a wide-mouthed casing 117, the restricted portion of which 118 acts as a cylinder in which the piston 115 travels. The valve stem 114 passes through a threaded collar 119 and is surrounded by a packing 120, a packing washer 121 and a tubular spring retainer 122, which keeps a spring 123 in engagement with the packing collar 121 to keep the packing 120 in place. The valve stem 114 passes through an aperture 124 at the bottom of the casing 119 in which a chamber 125 is formed in the coupling 126. A second chamber 127 is formed in the coupling 126 and separated from the chamber 125 by a partition 128 through which is an aperture 129 which is adaptedly closed by a valve member 130 carried on the end of the valve stem 114. The respective portions 131 and 132 of the brine line connect with the respective chambers 127 and 125 so that communication through the passage way 129 is controlled by the valve member 130.

All of the valves in the system are of similar construction save in some instances the operations reverse by putting the valve member 130 below the partition 128 instead of above it as in the salt valve, shown in section in Figure 8. It will be observed in that view that the same partition 128 having an aperture 129 separates the chambers 127 and 125. The chamber 127 in such instance communicates with the pipe 132, and the chamber 125 communicates with the pipe 133 which leads direct to the brine tank. The valve member 130 is on the bottom of the partition 128 and, when closed, moves upwardly.

In Figure 8, there are certain special features which will be hereinafter described which are not found in the other valve mechanism. For instance, the casing 117 carries an arm 134 on which is pivoted at 135 a right angle bell crank consisting of the arms 136 and 137. Carried on this bell crank on the arm 137 is a supporting collar 138 over the float arm 139 carrying the float 140. The lower end of the arm 136 is pivoted, indicated at 141, to a plunger 142, the inner end of which 143 projects through the wall 118 to lock the piston 115 in its uppermost position or its open position. A spring 144 mounted between a cotter pin 145 and the end of the bracket 146 serves to press this plunger inwardly. The bracket 146 is carried on the casing 118.

The outer end of the arm 137 carries a transverse pin 147 which works in a slot 148 in the vertical link 149 the other end of which is pivoted at 150 to a conventional switch arm 151 of a switch 96 which is supported on the valve casing of the brine valve 31. The purpose of this slot is to permit the float to operate in a predetermined distance in either direction before actuating the switch.

Referring to the injector (Fig. 6) the casing 25 has a pipe 21 connected to it by a coupling. The exact nature of this coupling is of no importance. Within the casing 25 is an inwardly approaching tubular member 152 which is open on one side 153 on which is mounted a nozzle 154 which is spaced from, on or adjacent to a collar 155 having a restricted opening 156. This opening is approached by a tapered opening 157 and a tapered opening 158. To this member 155 is connected by suitable collars 159, the exact nature of which is unimportant, a pipe 24. The interior of the inwardly approaching tubular member 152 is connected to the pipe 5. It will be recalled that the pipe 5 is the line through which the hard water flows during regeneration so that as the water passes up through the pipe 5, the interior inwardly approaching tubular member 152 and out the nozzle 154, through the opening 156 into the pipe 24 this will result in drawing brine from the brine tank through the pipe 27, from the opening 156 and the pipe 24 so that the brine is carried along with the incoming water and delivered into the softening material to regenerate.

Figure 12:
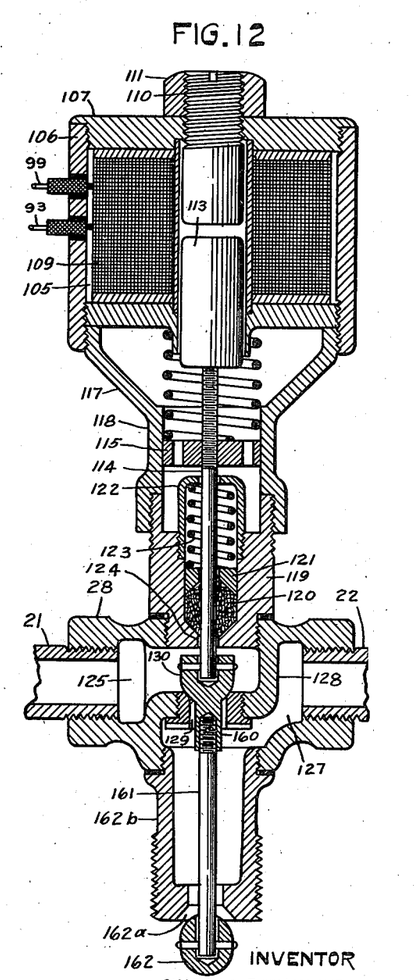
Figure 12 is a section of a by-pass valve.

Referring to the by-pass valve, a valve casing is connected with respective pipes 21 and 22. This casing is divided by the usual partition 128 with a valve stem 114 and a valve member 130 which, in this case, has an extending projection 160 into which is threaded a supplementary valve stem 161 carrying a valve member 162 which seats in a restricted opening 162$^a$. This opening is formed in a tubular member 162$^b$ on which is mounted the pipe 29. Thus, when the valve 130 is closed, the valve member 162 is in its open position.

The valve stems 114 and 161 are operated by a spring and solenoid as any other valves.

By brine valve I mean the valve 31 which shuts off the flow of brine from the brine tank to the softening apparatus. By refill valve I refer to valve 30 which controls the reverse flow of fresh water through the pipes to the salt tank, to replenish it with water. For convenience, I give these valves these names and so use them with this understanding in the claims.

*Detail operation.*

The hard water passes in through the pipe 1, actuating meter or similar mechanism 2, turning the driving member 55 and the disc 56. Thus the worm 62 turns the worm wheel 63. Assuming the mechanism is in a softening position, the valve 5$^a$ will be opened, the valve 26 will be closed and the valve 90 will be closed. The by-pass valve will be closed, the refill valve will be closed and the brine valve will be opened. The contact finger 73 will be riding on the bakelite insulating plate 72 while the contact finger 71 will be riding on its contact sleeve. When a sufficient amount of water has passed through the softener by the meter so that the mechanism needs regenerating, the high point on the bakelite cam will pass by the finger 73 allowing it to drop down on the contact members 74 and 75 and remain in contact therewith the time necessary for carrying out regenerating operation. As soon as this contact is made by way of contact members 73, 74 and 75 the circuit is closed and the armature is energized and actuated. This results in the opening of the drain valve, the closing of the valve 5ª, the opening of the valve 26 and the opening of the by-pass valve so that water can pass directly from pipe 1 through pipe 29 to pipe 22, but the communication cut off between 21 and 22. The refill valve is opened and the lock comes into play as in Figure 8 locking this valve open. The salt valve 31 is already opened and due to the fact that it is not energized remains in that condition as the switch 96 is not closed and prevents this valve from being actuated.

The action of the injector due to the fact that the water is passing up through pipe 5 into the top of the softening tank draws the brine from the brine tank which passes into the softening tank out through the pipe 7, through the drain valve 90 which is open, to the drain 91. This continues until the float 140 drops down, until the pin 147 engages with the bottom of the slot 148 of the link 149 throwing the switch 96. This energizes the salt valve mechanism causing the armature to operate and close the valve. As the parts are still in regeneration position, fresh water continues to flow downwardly through the regenerating material washing it clear of salt. By the time this operation is complete, the contact finger 73 has been lifted off of the contact members 74 and 75 by the high point of the cam of the bakelite plate 72 whereupon the valves 90, 26, 28 and 31 have their mechanism de-energized and returned to their normal position so that the drain valve is closed, the valve 26 is closed, the valve 30 is de-energized but still locked open and the valve 31 controlling the brine, being de-energized, is open. The by-pass line is closed, the valve 5ª is open. The water then flows to the bottom of the softening tank in the normal course of softening. A portion of this water is diverted through the casing 25 into the brine line 27 passing through the refill valve 30, which is still locked open, and through the open salt valve to the bottom of the salt tank to re-supply that tank with water which has been exhausted from it. This incoming water lifts the float 140 until enough water has been restored to the salt tank, at which time the float rises, pulls the locking pin 143 permitting the spring 116 to close the refill valve. This shuts off the delivery of any further water to the salt tank. At this time, the switch 96 is also open, so thrown that no current can be delivered to the solenoid operator.

Figures 2, 6:
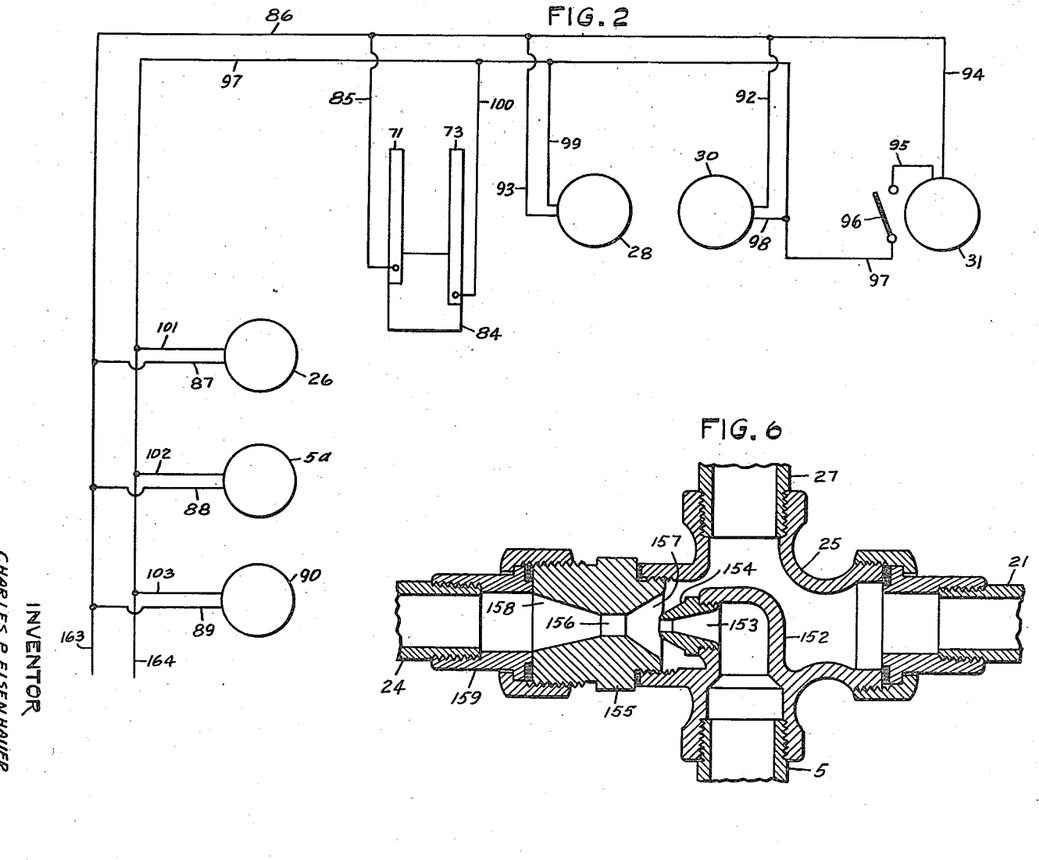
Figure 2 is a wiring diagram showing the arrangement of the circuit.
Figure 6 is a section through the injector mechanism.
Figure 3:
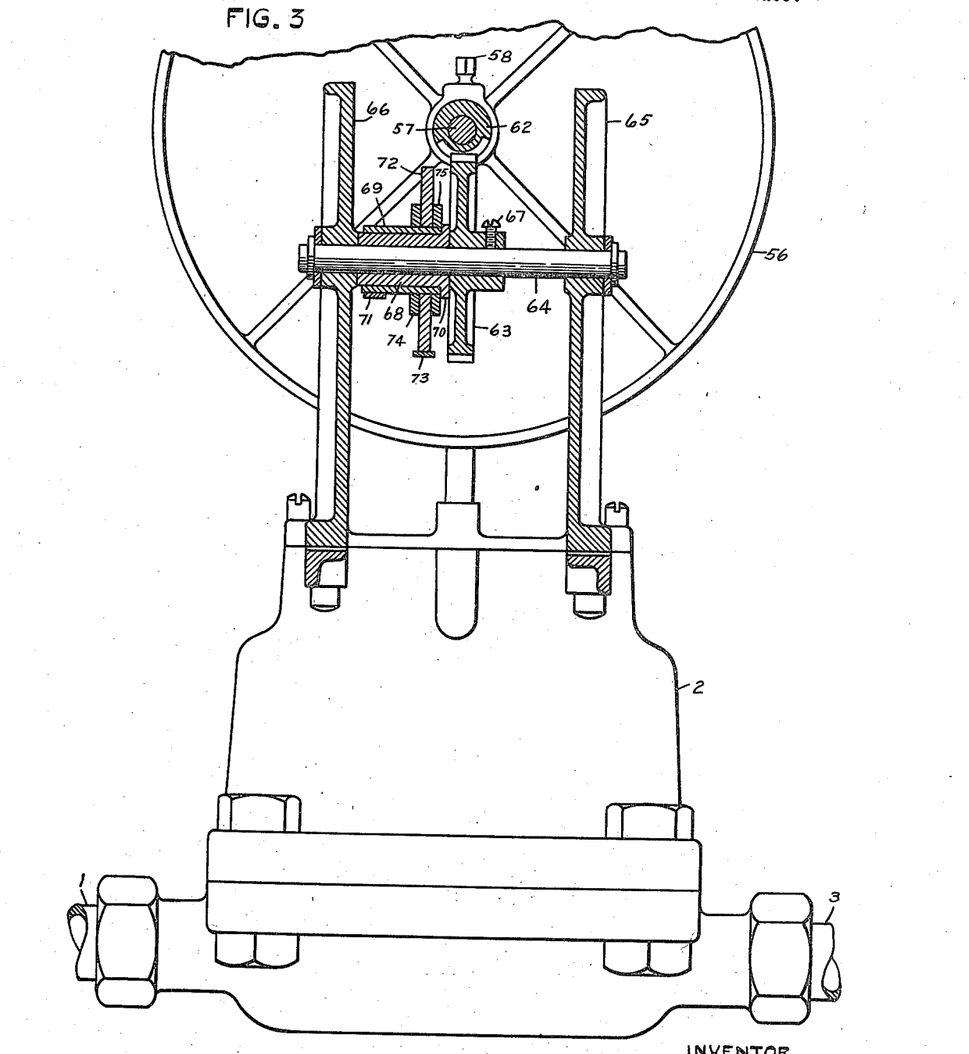
Figure 3 is a rear elevation partially in section showing the operating mechanism of the meter.

It will be understood that the terminals 163 and 164 of the wires 86 and 97 are connected with any suitable source of current.

It will be further understood that I comprehend within my invention such modifications as may be necessary to adapt it to varying conditions and use.

Having thus fully described my invention, what I claim as new and desire to secure by Letters Patent, is:—

1. In an automatic water softening apparatus, a container for a softening means, means to deliver hard water thereto, means to deliver regenerating material thereto, a source of regenerating material, valves for controlling the admission of water and regenerating material, electrical means for actuating said valves, and means actuated by the incoming hard water for making and breaking a circuit connecting said electrical means whereby said valves are operated or rendered inoperative.

2. In an automatic water softening apparatus, a container for a softening means, means to deliver hard water thereto, means to deliver regenerating material thereto, a source of regenerating material, valves for controlling the admission of water and regenerating material, electrical means for actuating said valves, and means actuated by the incoming hard water for making and breaking a circuit connecting said electrical means whereby said valves are operated or rendered inoperative, said valves consisting of a valve for controlling the delivery of water to the bottom of the softener, a valve for controlling the delivery of water to the top of the softener, and a valve controlling the delivery of regenerating material to the softener, a drain to drain the regenerating material from the softener and a drain valve therefor.

3. In an automatic water softening apparatus, a container for a softening means, means to deliver hard water thereto, means to deliver regenerating material thereto, a source of regenerating material, valves for controlling the admission of water and regenerating material, electrical means for actuating said valves, and means actuated by the incoming hard water for making and breaking a circuit connecting said electrical means whereby said valves are operated or rendered inoperative, said hard water being delivered to the bottom of the softening means during softening, and the regenerating materials being delivered to the top of the softening means during regeneration, and means for withdrawing the softened water and the spent brine at opposite ends of said softening means.

4. In an automatic water softening apparatus, a softening material container having softening materials, a hard water inlet line at one end, an outlet line at the other, means for delivering the hard water to the end opposite to which it is delivered during softening, a brine tank, means for delivering said brine to said softening tank, a refill valve and a brine valve in said brine line, means to lock said refill valve, a switch on said brine valve, a float and float arm actuated by said brine in the brine tank for actuating said switch and said lock, a drain line connected to said softening tank, a valve in the drain line, a valve in the line leading to one end of the tank, another valve in the line leading to the other end of the tank, means operated by the incoming hard water for making and breaking an electrical circuit, electrical means connected to said valves to operate them also connected to said circuit, a source of supply of current for the circuit, whereby the periods of regeneration and softening will be determined by the amount of water passing through the incoming hard water line and the salt tank will be replenished with water.

5. In an automatic water softening apparatus, a softening material container having softening materials, a hard water inlet line at one end, an outlet line at the other, means for delivering the hard water to the end opposite to which it is delivered during softening, a brine tank, means for delivering said brine to said softening tank, a refill valve and a brine valve in said brine line, means to lock said refill valve, a switch on said brine valve, a float and float arm actuated by said brine for actuating said switch and said lock, a drain line connected to said softening tank, a valve in the drain line, a valve in the line leading to one end of the tank, another valve in the line leading to the other end of the tank, means operated by the incoming hard water for making and breaking an electrical circuit, electrical means connected to said valves to operate them also connected to said circuit, a source of supply of current for the circuit, whereby the periods of regeneration and softening will be determined by the amount of water passing through the incoming hard water line and the salt tank will be replenished with water, said parts being so arranged that hard water is delivered to the bottom of the softening tank and taken out of the top during softening and hard water delivered at the top drawing brine with it during regeneration passing out of the bottom to the drain.

6. In an automatic water softening apparatus, a softening material container having softening materials, a hard water inlet line at one end, an outlet line at the other, means for delivering the hard water to the end opposite to which it is delivered during softening, a brine tank, means for delivering said brine to said softening tank, a refill valve and a brine valve in said brine line, means to lock said refill valve, a switch on said brine valve, a float and float arm actuated by said brine for actuating said switch and said lock, a drain line connected to said softening tank, a valve in the drain line, a valve in the line leading to one end of the tank, another valve in the line leading to the other end of the tank, means operated by the incoming hard water for making and breaking an electrical circuit, electrical means connected to said valves to operate them also connected to said circuit, a source of supply of current for the circuit, whereby the periods of regeneration and softening will be determined by the amount of water passing through the incoming hard water line and the salt tank will be replenished with water, said parts being so arranged that hard water is delivered to the bottom of the softening tank and taken out of the top during softening and hard water delivered at the top drawing brine with it during regeneration passing out of the bottom to the drain, and an injector associated with the hard water line to the top of the tank and the brine line to provide for drawing the brine to the top of the softening tank when the hard water is being delivered at the top thereof.

7. In an automatic water softening apparatus, an incoming hard water line, a water softening material tank having water softening material, a bottom pipe leading from the hard water line to the bottom of the tank, a top pipe leading from the hard water line to the top of the tank, a service line connected to the top of the tank and the top pipe, a brine line connected to the top of the tank and the top pipe, an injector associated therewith, a refill valve and a brine valve in said brine line, a brine tank, a float adapted to operate a lock for the refill valve and a switch for the brine valve, a lock, a switch, a drain line connected to the bottom pipe, a valve in the drain line, a valve in the bottom pipe, a valve in the top pipe, means in the incoming hard water line for regulating electrical contacts, an electrical circuit connected to said contacts, electrical contacts, a source of current in said circuit, an electrical means in said respective valves for actuating them in one direction and yielding means for actuating them in the other direction whereby as the hard water passes into the system said valves will be inoperative during the softening period and actuated upon the closing of the circuits during the regenerating period.

8. In an automatic water softening apparatus, an incoming hard water line, a water softening material tank having water softening material, a bottom pipe leading from the hard water line to the bottom of the tank, a top pipe leading from the hard water line to the top of the tank, a service line connected to the top of the tank and the top pipe, a brine line connected to the top of the tank and the top pipe, an injector associated therewith, a refill valve and a brine valve in said brine line, a brine tank having brine, a float adapted to operate a lock for the refill valve and a switch for the brine valve, a lock, a switch, a drain line connected to the bottom pipe, a valve in the drain line, a valve in the bottom pipe, a valve in the top pipe, means in the incoming hard water line for regulating electrical contacts, an electrical circuit connected to said contacts, electrical contacts, a source of current in said circuit, an electrical means in said respective valves for actuating them in one direction and yielding means for actuating them in the other direction, whereby as the hard water passes into the system, said valves will be inoperative during the softening period and actuated upon the closing of the circuits during the regenerating period, said parts being so arranged that during the softening period the water will pass through the bottom pipe upwardly through the softener to service line with the drain closed and the brine line closed, and during regenerating period the water will pass to the top of the softening tank downwardly to the drain and the brine will be drawn through the brine line by the injector to the top of the tank.

9. In an automatic water softening apparatus, an incoming hard water line, a water softening material tank having water softening material, a bottom pipe leading from the hard water line to the bottom of the tank, a top pipe leading from the hard water line to the top of the tank, a service line connected to the top of the tank and the top pipe, a brine line connected to the top of the tank and the top pipe, an injector associated therewith, a refill valve and a brine valve in said brine line, a brine tank having brine, a float adapted to operate a lock for the refill valve and a switch for the brine valve, a lock, a switch, a drain line connected to the bottom pipe, a valve in the drain line, a valve in the bottom pipe, a valve in the top pipe, means in the incoming hard water line for regulating electrical contacts, an electrical circuit connected to said contacts, electrical contacts, a source of current in said circuit, an electrical means in said respective valves for actuating them in one direction and yielding means for actuating them in the other direction, whereby as the hard water passes into the system, said valves will be inoperative during the softening period and actuated upon the closing of the circuits during the regenerating period, said parts being so arranged that during the softening period the water will pass through the bottom pipe upwardly through the softener to service line with the drain closed and the brine line closed, and during regenerating period the water will pass to the top of the softening tank downwardly to the drain and the brine will be drawn through the brine line by the injector to the top of the tank, and means for controlling the delivery of brine consisting of a float and float arm connecting to said lock on a refill valve and switch on the brine valve whereby when a pre-determined quantity of brine has been taken from the brine tank while the brine valve has not been energized and is open and the refill valve has been locked open having been energized upon the descent of the float to a pre-determined point the brine valve switch will be closed, the valve energized and the valve closed cutting off the brine, and upon all of the valves being deenergized said brine valve will open allowing a pre-determined quantity of water to pass from the service line into the brine tank, lifting the float and unlocking the refill valve, closing the brine line, the de-energizing of the brine valve having in the meanwhile permitted it to open.

10. In an automatic water softening apparatus, an incoming hard water line, a water softening material tank having water softening material, a bottom pipe leading from the hard water line to the bottom of the tank, a top pipe leading from the hard water line to the top of the tank, a service line connected to the top of the tank and the top pipe, a brine line connected to the top of the tank and the top pipe, an ejector associated therewith, a refill valve and a brine valve in said brine line, a brine tank having brine, a float adapted to operate a lock for the refill valve and a switch for the brine valve, a lock a switch, a drain line connected to the bottom pipe, a valve in the drain line, a valve in the bottom pipe, a valve in the top pipe, means in the incoming hard water line for regulating electrical contacts, an electrical circuit connected to said contacts, electrical contacts, a source of current in said circuit, an electrical means in said respective valves for actuating them in one direction and yielding means for actuating them in the other direction, whereby as the hard water passes into the system, said valves will be inoperative during the softening period and actuated upon the closing of the circuits during the regenerating period, said parts being so arranged that during the softening period the water will pass through the bottom pipe upwardly through the softener to service line with the drain closed and the brine line closed and during regenerating period the water will pass to the top of the softening tank downwardly to the drain and the brine will be drawn through the brine line by the injector to the top of the tank, and means for controlling the delivery of brine consisting of a float and float arm connecting to said lock on a refill valve and switch on the brine valve whereby when a pre-determined quantity of brine has been taken from the brine tank while the brine valve has not been energized and is open and the refill valve has been locked open having been energized, upon the descent of the float to a pre-determined point the brine valve switch will be closed, the valve energized and the valve closed cutting off the brine, and upon all of the valves being de-energized, said brine valve will open allowing a pre-determined quantity of water to pass from the service line into the brine tank, lifting the float and unlocking the refill valve, closing the brine line, the de-energizing of the brine valve having in the meanwhile permitted it to open, and a by-pass line from the hard water line to service line, and an electrically operated valve adapted to be opened to pass hard water directly from the hard water line to the service line during regeneration.

11. In an automatic water softening apparatus, an incoming hard water line, a water softening material tank having water softening material a bottom pipe leading from the hard water line to the bottom of the tank, a top pipe leading from the hard water line to the top of the tank, a service line connected to the top of the tank and the top pipe, a brine line connected to the top of the tank and the top pipe, an injector associated therewith, a refill valve and a brine valve in said brine line, a brine tank a float adapted to operate a lock for the refill valve and a switch for the brine valve, a lock, a switch, a drain line connected to the bottom pipe, a valve in the drain line, a valve in the bottom pipe, a valve in the top pipe, means in the incoming hard water line for regulating electrical contacts, an electrical circuit connected to said contacts, electrical contacts, a source of current in said circuit, an electrical means in said respective valves for actuating them in one direction and yielding means for actuating them in the other direction, whereby as the hard water passes into the system, said valves will be inoperative during the softening period and actuated upon the closing of the circuits during the regenerating period, said parts being so arranged that during the softening period the water will pass through the bottom pipe upwardly through the softener to service line with the drain closed and the brine line closed, and during regenerating period the water will pass to the top of the softening tank downwardly to the drain and the brine will be drawn through the brine line by the injector to the top of the tank, and means for controlling the delivery of brine consisting of a float and float arm connecting to said lock on a refill valve and switch on the brine valve whereby when a pre-determined quantity of brine has been taken from the brine tank, while the brine valve has not been energized and is open, and the refill valve has been locked open having been energized, upon the decent of the float to a pre-determined point the brine valve switch will be closed, the valve energized and the valve closed cutting off the brine, and upon all of the valves being de-energized, said brine valve will open allowing a pre-determined quantity of water to pass from the service line into the brine tank, lifting the float and unlocking the refill valve, closing the brine line, the de-energizing of the brine valve having in the meanwhile permitted it to open, and a by-pass line from the hard water line to the service line, electrically operated valve adapted to be opened to pass hard water directly from the hard water line to the service line during regeneration, said brine line being located adjacent the bottom of the brine tank.

12. In an automatic water softening apparatus, an incoming hard water line, a bottom pipe connected thereto leading to the bottom of the softening tank, a softening tank, softening material therein between spaced screens at the top or bottom, spaced screens, a top pipe connecting the top of the tank to said hard water line, a softening supply valve in the bottom pipe, a hard water supply valve in the top pipe, a drain pipe connected to the bottom pipe, a drain valve therein, a meter and incoming hard water line, contacts actuated thereby for making and breaking electrical circuit, an electrical circuit, a source of supply of current thereto, an injector in the top pipe, a brine line connected thereto, a service line connected thereto, a brine line valve, a refill valve, a lock for the refill valve, a switch for the brine valve, a float for operating said lock and said switch located in the brine tank, a brine tank, electrical means adapted to operate said valves, said means being connected to said circuit, and yielding means to operate said valves in the reverse direction, whereby when the circuit is in one condition, softening and replenishing of the salt tank will take place and when the circuit is in another condition, the valves will be shifted, regeneration will take place by the delivery of brine from the brine tank, and the brine will be flushed from the softening material.

13. In an automatic water softening apparatus, an incoming hard water line, a bottom pipe connected thereto leading to the bottom of the softening tank, a softening tank, softening material therein between spaced screens at the top or bottom, spaced screens, a top pipe connecting the top of the tank to said hard water line, a softening supply valve in the bottom pipe, a hard water supply valve in the top pipe, a drain pipe connected to the bottom pipe, a drain valve therein, a meter and incoming hard water line, contacts actuated thereby for making and breaking electrical circuit, an electrical circuit, a source of supply of current thereto, an injector in the top pipe, a brine line connected thereto, a service line connected thereto, a brine line valve, a refill valve, a lock for the refill valve, a switch for the brine valve, a float for operating said lock and said switch located in the brine tank, a brine tank, electrical means adapted to operate said valves, said means being connected to said circuit and yielding means to operate said valves in the reverse direction, whereby when the circuit is in one condition softening and replenishing of the salt tank will take place and when the circuit is in another condition the valves will be shifted, regeneration will take place by the delivery of brine to the brine tank, and the brine will be flushed from the softening material, and a by-pass valve around the injector from the top of the tank to the service line to permit unrestricted flow around the injector during softening.

14. In an automatic water softening apparatus, an incoming hard water line, a bottom pipe connected thereto leading to the bottom of the softening tank, a softening tank, softening material therein between spaced screens at the top or bottom, spaced screens, a top pipe connecting the top of the tank to said hard water line, a softening supply valve in the bottom pipe, a hard water supply valve in the top pipe, a drain pipe connected to the bottom pipe, a drain valve therein, a meter and incoming hard water line, contact actuated thereby for making and breaking an electrical circuit, an electrical circuit, a source of supply of current thereto, an injector in the top pipe, a brine line connected thereto, a service line connected thereto, a brine line valve, a refill valve, a lock for the refill valve, a switch for the brine valve, a float for operating said lock and said switch located in the brine tank, a brine tank, electrical means adapted to operate said valves, said means being connected to said circuit, and yielding means to operate said valves in the reverse direction, whereby when the circuit is in one condition, softening and replenishing of the salt tank will take place and when the circuit is in another condition, the valves will be shifted, regeneration will take place by the delivery of brine to the brine tank and the brine will be flushed from the softening material, a by-pass valve having electrical means connected to said circuit and yielding means to operate it in the opposite direction, a by-pass line connected to said by-pass valve, said valve being located in the service line.

15. In an automatic water softening apparatus, an incoming hard water line, a bottom pipe connected thereto leading to the bottom of the softening tank, a softening tank, softening material therein between spaced screens at the top or bottom, spaced screens, a top pipe connecting the top of the tank to said hard water line, a softening supply valve in the bottom pipe, a hard water supply valve in the top pipe, a drain pipe connected to the bottom pipe, a drain valve therein, a meter and incoming hard water line, contacts actuated thereby for making and breaking an electrical circuit, an electrical circuit, a source of supply of current thereto, an injector in the top pipe, a brine line connected thereto, a service line connected thereto, a brine line valve, a refill valve, a lock for the refill valve, a switch for the brine valve, a float for operating said lock and said switch located in the brine tank, a brine tank, electrical means adapted to operate said valves, said means being connected to said circuit, and yielding means to operate said valves in the reverse direction, whereby when the circuit is in one condition, softening and replenishing of the salt tank will take place and when the circuit is in another condition, the valves will be shifted, regeneration will take place by the delivery of brine to the brine tank, and the brine will be flushed from the softening material, a by-pass valve having electrical means connected to said circuit and yielding means to operate it in the opposite direction, a by-pass line connected to said by-pass valve, said valve being located in the service line, said parts being so arranged that during softening the water passes to the bottom of the softening tank and out of the top to the service line at which time the circuit is dead, and during regeneration, the hard water passes to the top of the softening tank, out the bottom of the drain drawing the salt water from the brine tank through the injector, the by-pass valve being so arranged to by-pass hard water direct to the service line and upon completion of the delivery of the brine, the brine valve is closed by the closing of the brine valve switch and the salt is flushed from the softening material, and upon the starting of the re-softening, the brine valve is open and a portion of the water is diverted to the salt tank to replenish it, and upon replenishment thereof, the float therein unlocks the refill valve allowing the refill to close, and yielding means to operate said valves in the direction opposite to that they are moved electrically.

16. In an automatic water softening apparatus, an incoming hard water line, a bottom pipe connected thereto leading to the bottom of the softening tank, a softening tank, softening material therein between spaced screens at the top or bottom, spaced screens, a top pipe connecting the top of the tank to said hard water line, a softening supply valve in the bottom pipe, a hard water supply valve in the top pipe, a drain pipe connected to the bottom pipe, a drain valve therein, a meter and incoming hard water line, contacts actuated thereby for making and breaking electrical circuit, an electrical circuit, a source of supply of current thereto, an injector in the top pipe, a brine line connected thereto, a service line connected thereto, a brine line valve a refill valve, a lock for the refill valve, a switch for the brine valve, a float for operating said lock and said switch located in the brine tank, a brine tank, electrical means adapted to operate said valves, said means being connected to said circuit, and yielding means to operate said valves in the reverse direction, whereby when the circuit is in one condition, softening and replenishing of the salt tank will take place and when the circuit is in another condition, the valves will be shifted, regeneration will take place by the delivery of brine to the brine tank and the brine will be flushed from the softening material, a by-pass valve having electrical means connected to said circuit and yielding means to operate it in the opposite direction, a by-pass line connected to said by-pass valve, said valve being located in the service line, said parts being so arranged that during softening, the water passes to the bottom of the softening tank and out of the top to the service line, at which time the circuit is dead, and during regeneration, the hard water passes to the top of the softening tank, out the bottom of the drain drawing the salt water from the brine tank through the injector, the by-pass valve being so arranged to by-pass hard water direct to the service line, and upon completion of the delivery of the brine, the brine valve is closed by the closing of the brine valve switch and the salt is flushed from the softening material, and upon the starting of the re-softening, the brine valve is opened and a portion of the water is diverted to the salt tank to replenish it, and upon replenishment thereof, the float therein unlocks the refill valve allowing the refill to close, and yielding means to operate said valves in the direction opposite to that they are moved electrically, said brine line having its brine end located adjacent the bottom of the brine tank.

In testimony whereof I affix my signature.

CHARLES P. EISENHAUER.